Feb. 7, 1950 G. E. BRODE ET AL 2,496,266

TWO-WAY AMPLIFIER FOR ELIMINATING OPPOSITELY DIRECTED SIGNALS

Filed Nov. 18, 1947

INVENTORS
GEORGE E. BRODE
HAYES B. STEINHAUSER
BY Percy P. Lantzy
ATTORNEY

Patented Feb. 7, 1950

2,496,266

UNITED STATES PATENT OFFICE 2,496,266

TWO-WAY AMPLIFIER FOR ELIMINATING OPPOSITELY DIRECTED SIGNALS

George E. Brode, Newark, and Hayes B. Steinhauser, Montclair, N. J., assignors to Federal Telephone and Radio Corporation, New York, N. Y., a corporation of Delaware Application November 18, 1947, Serial No. 786,728

6 Claims. (Cl. 179—170)

Figure 1:
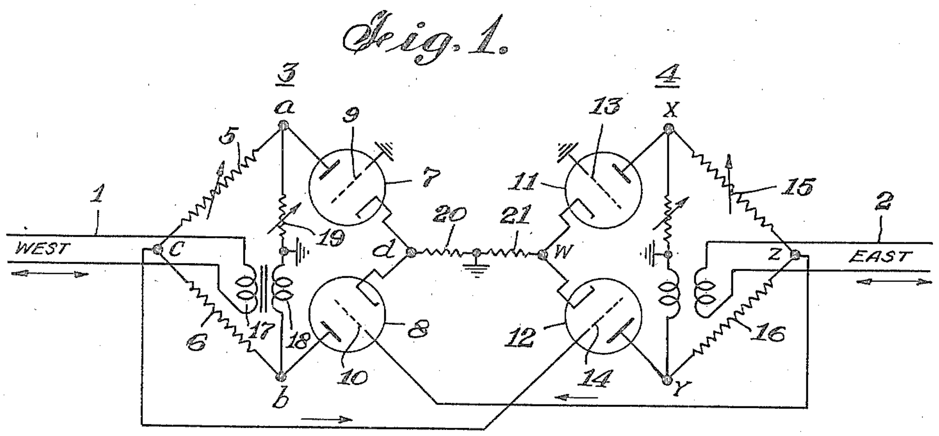

Our invention relates to two-way amplifiers for eliminating oppositely directed signals and is particularly directed to amplifiers for relaying voice signals traveling in either direction in a two wire transmission circuit.

The two-way amplifiers standardized for ordinary two-wire telephone service are more complex and more expensive than can be justified in many small installations such as sound-powered systems. In airport control systems, for example, the noise level at certain stations may require amplifiers in some of the interconnecting telephone lines. A large item of cost in all of two-way amplifiers for two-wire, or single circuit, systems is in the circuits for preventing feed back and oscillations at the amplifiers, the hybrid coil and balanced bridge being the central features of conventional means for isolating oppositely directed signal currents.

The general objects of our invention is improved two-way amplifiers.

A more specific object of our invention is simplified means for isolating oppositely directed signal currents in two-way amplifiers.

Other and more specific objects of our invention will appear in the following specification in which a preferred embodiment of our invention is described. The appended claims define the scope of our invention and the accompanying drawing shows said preferred embodiment.

Figure 2:
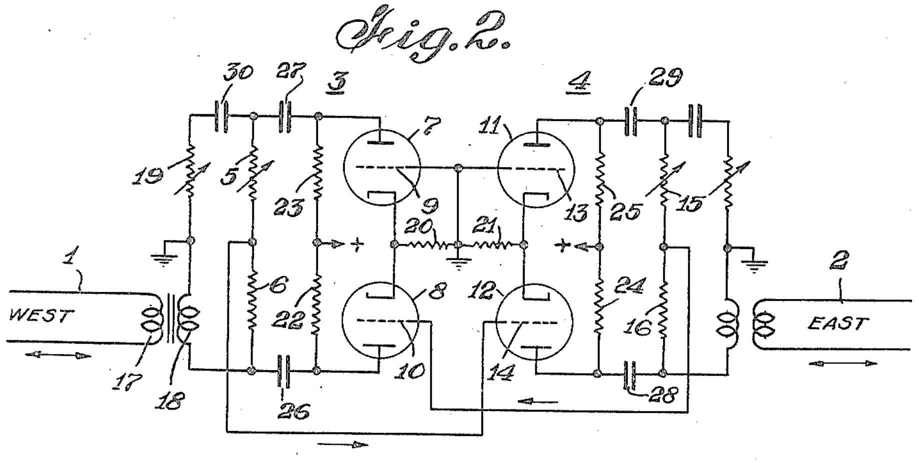

In the drawing:

Fig. 1 is a diagram of the signal circuits only of the preferred embodiment of our two-way amplifier; and Fig. 2 is a circuit diagram of a commercial embodiment of the amplifier of Fig. 1.

The two-wire signal circuit, in which a two-way amplifier is to be inserted, is for convenience divided, the two portions 1 and 2 being identified as "west" and "east" lines, respectively. Because the two-wire circuits must conduct signal voltages in both directions, the input and output circuits of the amplifiers must be coupled together, and yet the amplifiers must not "sing" or oscillate. Two four-sided Wheatstone bridge networks 3 and 4 are shown, impedances 5 and 6 in bridge 3, preferably being resistive in nature and in adjacent arms of the bridge. The other two arms of bridge 3 comprise the anode-cathode resistances of amplifier tubes 7 and 8, the cathodes being connected together and to a common cathode resistor. Control grids 9 and 10 are important, but screen or suppressor grids are optional, in the operation to be described. The tubes 11 and 12, with grids 13 and 14, and impedances 15 and 16 comprise the four arms of bridge 4.

The "west" line is coupled across one diagonal *a*—*b* of bridge 3 by way of the coupling transformer with primary and secondary windings 17 and 18, respectively, the transformer being shown because it is one of the more convenient impedance matching devices. In series with the transformer secondary is an additional impedance 19 having the approximate ohmic value of the connected transformer winding. The junction of elements 18 and 19, which is the electrical center of the diagonal when 18 and 19 are equal is grounded. Thus, because of the asymmetry of the transformer 18 in the diagonal, signals applied to the one diagonal *a*—*b*, from line 1 will appear across the other diagonal *c*—*d*, or between apex *c* and ground.

The voltage at *c* of bridge 3 is applied to the grid 14 of amplifier 12 of bridge 4, the corresponding apex of bridge 4 being connected to the grid 10 of amplifier 8 of bridge 3. The grids 9 and 13 of the remaining amplifier tubes are directly grounded, and the cathodes of the amplifiers of either bridge are connected together and to ground through a common cathode resistor, the cathode resistors for the two pairs of tubes being shown at 20 and 21.

Assume a signal arrives over line 1. This signal will appear at apex *c* and hence at the grid 14 of amplifier 12. Now, since the space current of amplifier 12 flows through cathode resistor 21, the signal voltage will appear across resistor 21. But since resistor 21 is directly across the input of amplifier tube 11, the signal voltage is received and amplified by tube 11, and since the one tube receives its signal from the cathode resistor of the other tube, the signal voltage variations at the two anodes are in phase opposition. (Load resistors and anode power supplies are purposely omitted in Fig. 1.) The effective push-pull operation of the amplifiers 11 and 12 accordingly apply at apices *x* and *y* of bridge 4 an amplified signal which, flowing in the *x*—*y* diagonal circuit, is applied to the "east" line 2. But the signal from "west" appearing at *x*—*y* will produce no signal voltage across the other diagonal *w*—*z* with impedances 15 and 16 balanced, and will transmit no part of the "west" signal from *z* to grid 10. Oscillations and singing due to feedback are effectively prevented. Signals arriving from the "east" line are likewise amplified and fed into the "west" line without oscillations.

One commercial embodiment of our novel two-way amplifier is shown in Fig. 2, the reference characters in the two figures being the same for like parts. Load resistors 22 and 23 are connected to the anodes of amplifiers 7 and 8, respectively, and at their common junction are connected to a high anode-voltage source. Load resistors 24 and 25 are similarly connected to the anodes of amplifiers 11 and 12. To obtain equal output voltages from amplifiers 13 and 14, the plate load resistor 24 should be smaller than resistor 25 because of the difference in amplitude of the signal applied to the cascaded grid circuits. The usual blocking condensers 26, 27, 28 and 29 keep direct current and high voltages out of the signal circuits. The reactance of condenser 30 may be adjusted to balance the reactance of winding 18.

In one system similar to that of Fig. 2, amplifiers 7 and 8, as well as 13 and 14, comprised the triode sections of a commercial "6SN7." The anode voltages were 250 volts, and the value of resistors 5, 6, 15, 16 was about 100,000 ohms each. Initial balance was made by applying a signal at the "east" line and adjusting resistor 5 until oscillations cease. Resistor 19 could be adjusted with the same result. Then a signal was applied at the "west" line and resistor 15 adjusted until oscillations ceased.

The circuit components of our two-way amplifier may be comprised entirely of inexpensive condensers and resistors, it being permissible to even eliminate the transformers if impedance matching by other means is provided. Because of the ease of balancing the circuits, variations in component tolerances over long periods of time can be easily corrected without replacement of parts or further servicing. The entire two-way amplifier may be constructed in small light-weight units.

We claim:

1. A two-way amplifier system comprising two bridge networks, each network consisting of two impedance elements in adjacent arms and two amplifier tubes in the other two arms of the bridge, a signal input circuit asymmetrically connected across one diagonal defined by the junction points of each element and a tube, and a signal output circuit asymmetrically connected across the other diagonal and to the input of one amplifier tube of the second network.

2. A two-way amplifier comprising a first and a second Wheatstone bridge, each bridge having an amplifying tube in each of two adjacent arms and balancing impedance elements in the remaining arms, a two-way signal circuit coupled across the diagonal of each bridge defined by the apices between the tubes and impedance elements, the other diagonal of each bridge being coupled across the input of one tube of the opposite bridge.

3. In the two-way amplifier defined in claim 2, each of said two-way signal circuits positioned asymmetrically in the coupled diagonal with respect to the electrical center of the diagonal.

4. In the two-way amplifier defined in claim 2, each of the first mentioned diagonals including the winding of a signal transformer and a series impedance element, the junction of the winding and the series element being fixed at a grounding potential with respect to the remainder of the bridge.

5. In the two-way amplifier defined in claim 2, including the mentioned coupling between the input of one tube of each bridge and the diagonal of the opposite bridge, further comprising a coupling between the output of said one tube of each bridge and the input of the tube of the adjacent arm of the bridge.

6. In the two-way amplifier defined in claim 2, including the coupling between the input of said one tube and the opposite bridge, further comprising a common cathode resistor for the two tubes of each bridge, the input of the tube adjacent said one tube being coupled direct across the common cathode resistor so that signals are amplified in cascade by the tubes of each bridge and are impressed in phase opposition across the defined diagonal of the bridge.

GEORGE E. BRODE.
HAYES B. STEINHAUSER.

REFERENCES CITED

The following references are of record in the file of this patent:

UNITED STATES PATENTS

| Number | Name | Date |
|---|---|---|
| 1,501,726 | Rice ______________ | July 15, 1924 |
| 2,085,488 | Woodward et al. ____ | June 29, 1937 |

Disclaimer 2,496,266.—*George E. Brode*, Newark, and *Hayes B. Steinhauser*, Montclair, N. J. TWO-WAY AMPLIFIER FOR ELIMINATING OPPOSITELY DIRECTED SIGNALS. Patent dated Feb. 7, 1950. Disclaimer filed Dec. 8, 1951, by the assignee, *Federal Telephone and Radio Corporation*.

Hereby enters this disclaimer to claims 1 to 4, inclusive, of said patent.
[*Official Gazette January 15, 1952.*]